United States Patent Office 2,983,146
Patented May 9, 1961

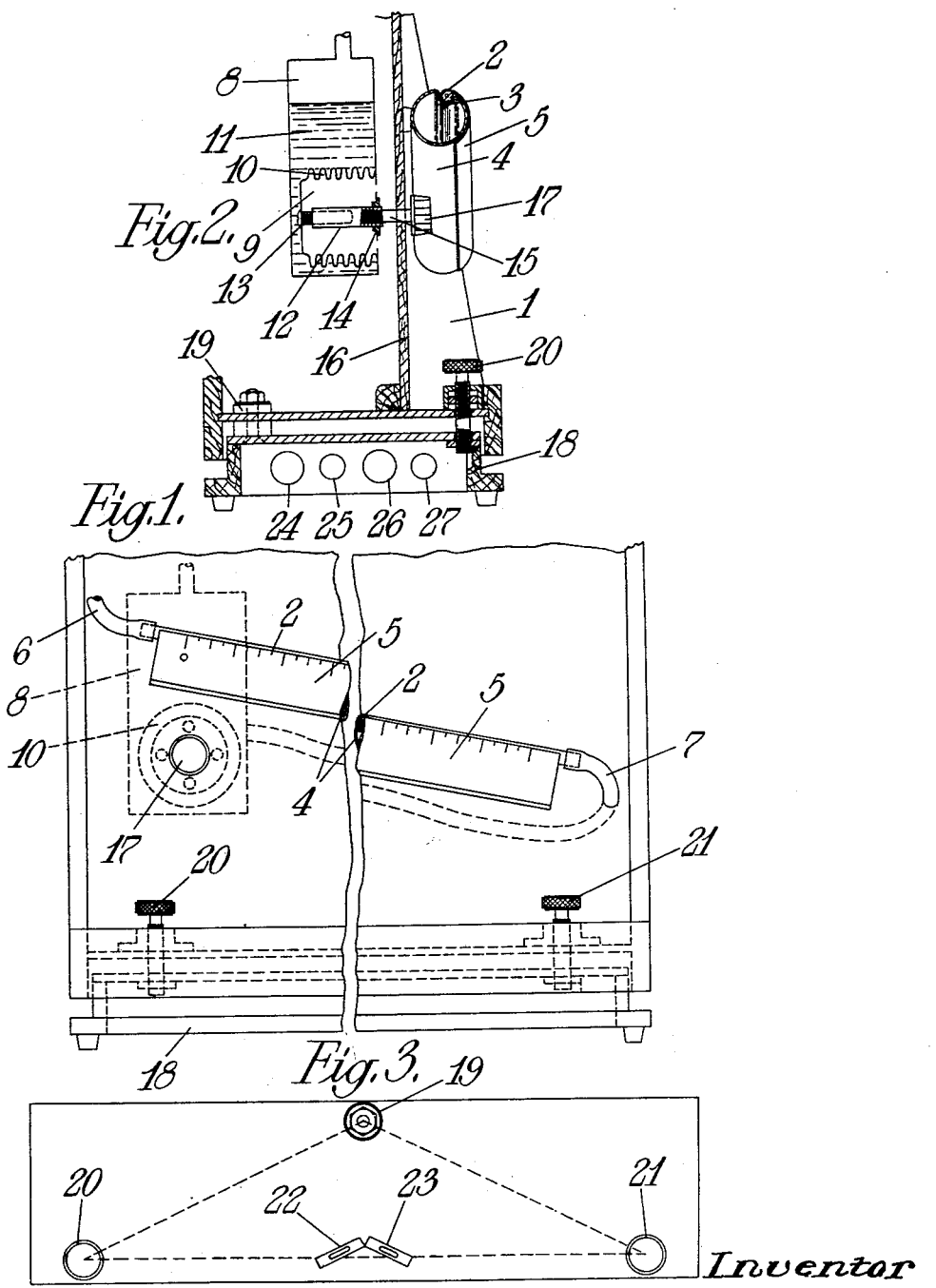

2,983,146

INSTRUMENTS FOR MEASURING PRESSURES IN FLUIDS

Alexander Connor Wilson, The White House, New Road, Booker, High Wycombe, England Filed Aug. 22, 1955, Ser. No. 529,679

Claims priority, application Great Britain Aug. 20, 1954

2 Claims. (Cl. 73—401)

This invention relates to instruments for measuring pressures in fluids and has for its main object to provide such an instrument which is suitable for measuring the flow or pressure of air or gas in pipes or ducts and which is not only easy and convenient to use, but which also gives accurate readings when taking measurements.

Instruments of this character, which are generally known as manometers, usually comprise one or more tubes containing a suitable liquid against which the pressure to be measured is balanced, the liquid in the tubes being so arranged that its moniscus can be viewed against a graduated scale so that its position as determined by the pressure applied to the liquid may be read off. In manometers of the kind heretofore known, the tubes containing the liquid are usually either provided with solid supports along their entire length, or they are supported only at their ends or at several points spaced apart from each other. Neither of these arrangements, however, are particularly satisfactory as in the case of the former arrangement the apparatus becomes unduly heavy and cumbersome, while in the case of the latter arrangement, the tube is inclined to bend between the points of support and this leads to inaccuracies of reading, particularly in cases where the tube is inclined.

The present invention has for its main object to overcome these disadvantages and the invention accordingly consists in an instrument for measuring pressures in fluids comprising a manometer tube mounted in a groove or recess in the wall of a supporting tube, and held in place by a strip of material carrying a graduated scale against which the meniscus level of the liquid in the manometer tube may be read.

The invention also consists in an instrument for measuring pressures in fluids comprising a manometer tube provided with a reservoir tank for the displaced liquid and an adjustable bellows disposed within the liquid in such a way that the expansion or contraction of the bellows varies the level of liquid in the reservoir tank so as to adjust the zero position of the meniscus in the tube before the pressure to be measured is applied.

The invention also consists in an instrument for measuring pressures in fluids comprising a casing for one or more manometer tubes and a supporting base operatively associated with the casing at three points by a flexible mounting and two adjustable mountings, such three points being disposed at the corners of a triangle whereby the casing may be accurately levelled by adjustment of the two adjustable mountings.

The invention will be more completely understood from the following detailed description, which is given in conjunction with the accompanying drawing, in which:

Figures 1 and 2 are front and sectional end views respectively of a measuring instrument constructed in accordance with the invention; and Figure 3 is a plan view of the base of the instrument shown in Figures 1 and 2.

Referring now to these drawings, I construct my improved measuring instrument in the form of an elongated casing 1 in which I provide a manometer tube 2, and for the purpose of supporting this tube in position in the casing, I arrange for the tube to be mounted in a precision groove 3 which is formed longitudinally in the wall of a tube 4 which is of larger diameter and which is substantially equivalent in length to that of the manometer tube 2, this tube 4 of larger diameter being formed of metal or other suitable material so as to constitute a rigid support for the manometer tube 2 throughout the whole or greater part of its length. The manometer tube 2 is held in this groove 3 by a curved or formed strip 5 which is mounted on the wall of the supporting tube 4 in such a way so as to partially overlap the manometer tube 2 so as to press the latter firmly into the base of the groove 3 and this curved or formed strip 5 is engraved or otherwise provided with a graduated scale against which the position of the meniscus in the manometer tube 2 may be read off.

Conveniently, the ends of the manometer tube 2 terminate in flexible connections 7, 6 leading respectively to a reservoir tank 8 and a terminal point at some convenient point in the casing 1 to which the pressure to be measured may be connected, for example, by means of a suitable pipe or conduit.

In order that the level of liquid in the manometer tube 2 may be adjusted to zero or other suitable position on the graduated scale prior to taking a measurement, the aforesaid reservoir tank 8 is provided with a bellows 9 which is immersed in the liquid in such a way that its folds or convolutions 10 lie substantially in a vertical plane and are unable to trap air or gas below the surface of the liquid. With this arrangement, the liquid 11 in the reservoir tank is on the outside of the bellows and the inside of the bellows is virtually open to atmosphere so that by expanding or contracting the bellows, the level of liquid in the reservoir tank will be raised or lowered, and the level of liquid in the manometer tube, that is to say the meniscus, will be correspondingly adjusted. In the arrangement shown the bellows 9 is provided with a central sleeve 12 having internal and external threads formed to operate in opposite senses, this sleeve engaging on the one hand with a screw 13 attached to one end of the bellows, and on the other hand with a threaded bushing 14 attached to the other end of the bellows, so that rotation of the sleeve 12 causes the bellows to be expanded or contracted. Conveniently, this sleeve 12 is provided with a spindle 15 which extends through the instrument panel 16 for operation by a control knob 17 so that the latter may be easily actuated by the operator.

In order that the instrument may be accurately levelled, a supporting base 18 is provided which is attached to the underside of the main instrument casing by means of a single flexible mounting 19 and two adjusting screws 20, 21. These three points of junction between the base 18 and the main casing are disposed at the corners of a triangle which in one convenient arrangement is of isosceles form having its base substantially parallel to and near to the front of the instrument and its apex centrally disposed near the back of the instrument. The two adjusting screws 20, 21 are disposed at opposite ends of the base of the triangle and provide means for levelling the instrument in any direction. Such levelling may be facilitated by arranging two spirit level tubes 22, 23 parallel to the two equal sides of the triangle running from the adjusting screws to the flexible mounting so that with such an arrangement, each spirit level tube would show movement only by adjustment of the screws on the side of the triangle with which it is parallel.

If desired, the aforesaid supporting base 18 may be provided with a set of folding or expandable legs 24, 25, 26, 27 by means of which the whole instrument may be supported at a convenient height during use.

I claim:

1. An instrument for measuring pressures in fluids, comprising a reservoir tank containing liquid and connected to a manometer tube and a rigid supporting tube for said manometer tube, said supporting tube being substantially equivalent in length to, but of larger diameter than, said manometer tube, said supporting tube having a groove formed longitudinally in its wall to receive and partly surround said manometer tube throughout substantially the whole of its length, and a retaining strip on the supporting tube to hold said manometer tube within said groove, said retaining strip being provided with a graduated scale against which the meniscus level of the liquid in the manometer tube may be read, and an adjustable bellows disposed within the liquid for varying the level of liquid in the reservoir tank to adjust the zero position of the meniscus in the tube before the pressure to be measured is applied, said bellows having its convolutions completely immersed in the liquid in the reservoir tank and disposed in a substantially vertical plane, a casing for said supporting and manometer tubes, and a supporting base connected with the casing at three points by a flexible mounting and two adjustable mountings, said three points being disposed at the corners of a triangle, whereby the casing may be accurately levelled by adjustment of the adjustable mountings.

2. An instrument for measuring pressures in fluids, comprising a reservoir tank containing liquid and connected to a manometer tube and a rigid supporting tube for said manometer tube, said supporting tube being substantially equivalent in length to, but of larger diameter than, said manometer tube, said supporting tube having a groove formed longitudinally in its wall to receive and partly surround said manometer tube throughout substantially the whole of its length, and a retaining strip so shaped as to fit over the outside of said support tube and hold said manometer tube within said groove, said retaining strip being provided with a graduated scale against which the meniscus level of the liquid in the manometer tube may be read, and an adjustable bellows disposed within the liquid to vary the level of liquid in the reservoir tank to adjust the zero position of the meniscus in the tube before the pressure to be measured is applied, said bellows being completely immersed in the liquid, in the reservoir tank, and having its convolutions disposed in a substantially vertical plane, a casing for said supporting and manometer tubes, and a supporting base connected with the casing at three points by a flexible mounting and two adjustable mountings, said three points being disposed at the corners of a triangle, whereby the casing may be accurately levelled by adjustment of the adjustable mountings.

References Cited in the file of this patent

UNITED STATES PATENTS

| Number | Name | Date |
|---|---|---|
| 874,643 | Tokheim | Dec. 24, 1907 |
| 1,423,565 | Kemp | July 25, 1922 |
| 1,616,033 | Ellison | Feb. 1, 1927 |
| 1,917,846 | Klopsteg | July 11, 1933 |
| 2,021,280 | Bandoly | Nov. 19, 1935 |
| 2,039,337 | Nolan | May 5, 1936 |
| 2,102,364 | Langsner | Dec. 14, 1937 |
| 2,384,159 | Euyler et al. | Sept. 4, 1945 |
| 2,617,304 | Conover | Nov. 11, 1952 |
| 2,690,676 | Heuboske et al. | Oct. 5, 1954 |
| 2,738,676 | Worden et al. | Mar. 20, 1956 |

FOREIGN PATENTS

| Number | Country | Date |
|---|---|---|
| 395,399 | Great Britain | July 17, 1933 |